United States Patent [19]
Kleykamp et al.

[11] 3,727,949
[45] Apr. 17, 1973

[54] HOSE CONSTRUCTION

[75] Inventors: Donald L. Kleykamp, Springboro; Peter J. Neroni, Dayton, both of Ohio; Homer N. Holden, Sylva, N.C.

[73] Assignee: Dayco Corporation, Dayton, Ohio

[22] Filed: Dec. 20, 1971

[21] Appl. No.: 209,829

[52] U.S. Cl. ...................285/7, 285/226, 285/239, 285/280, 285/DIG. 22, 285/DIG. 4
[51] Int. Cl. ...............................................A47i 9/24
[58] Field of Search.........................285/7, 226–239, 285/174, 280, DIG. 4, DIG. 22

[56] References Cited

UNITED STATES PATENTS

| 2,047,713 | 7/1936  | Simpson    | 285/226 X   |
| 3,167,330 | 1/1965  | Draudt     | 285/7       |
| 2,366,067 | 12/1944 | Smith      | 285/DIG. 22 |
| 2,460,851 | 2/1949  | Sheppard   | 285/239 X   |
| 3,017,654 | 1/1962  | Allenby et al. | 285/280 X |
| 3,149,362 | 9/1964  | Smithson   | 285/7 X     |
| 3,565,464 | 2/1971  | Wolf       | 285/7       |

Primary Examiner—Dave W. Arola
Attorney—Reuben Wolk

[57] ABSTRACT

An elongated hose construction is provided which is particularly adapted for use on a vacuum cleaner. The hose construction comprises a hose having a plurality of integral convolutions which give the hose optimum flexibility and at least one convolution comprising one end portion of the hose is used to attach a simple, inexpensive fitting thereto in a substantially air tight manner.

9 Claims, 7 Drawing Figures

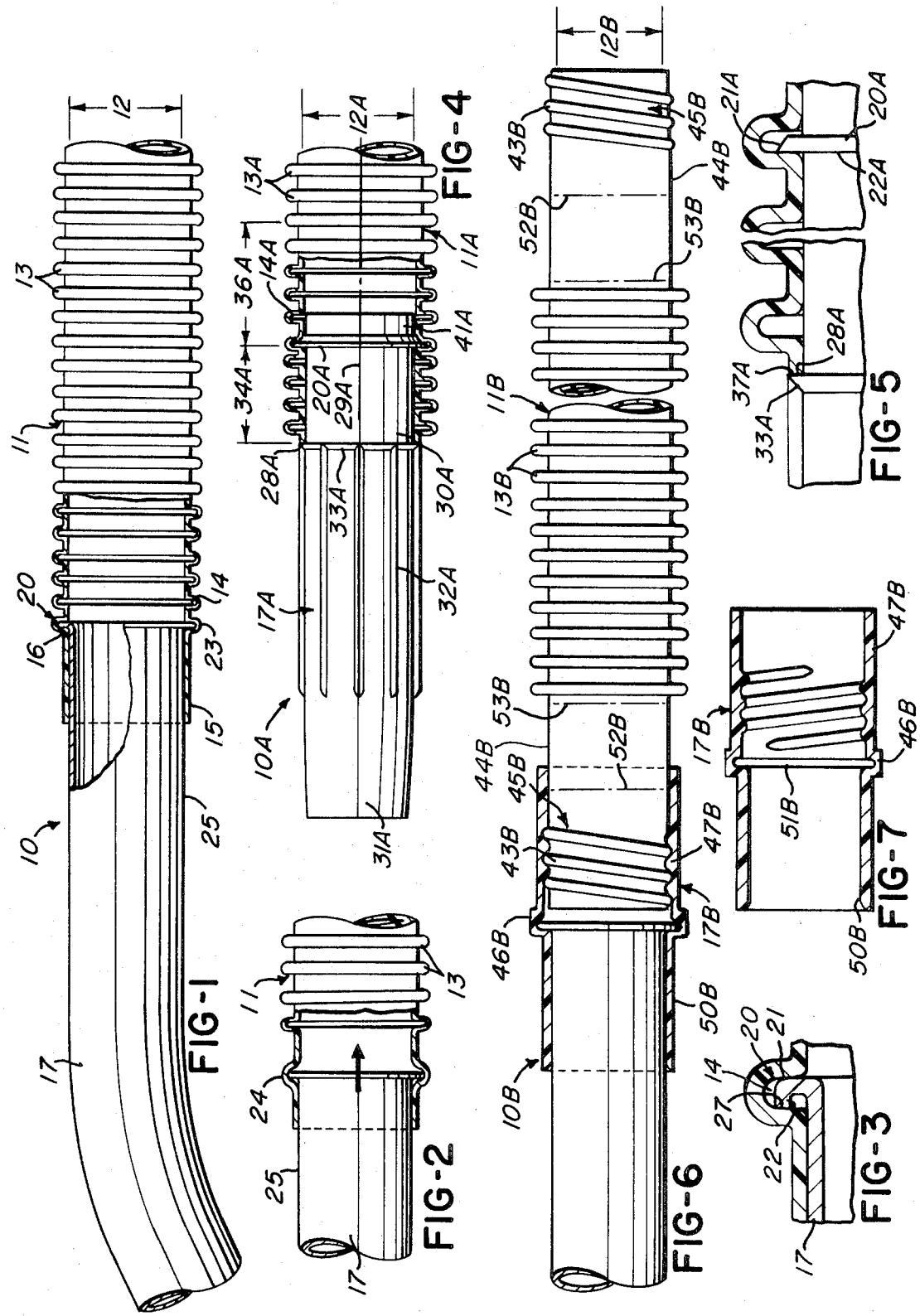

3,727,949

HOSE CONSTRUCTION

BACKGROUND OF THE INVENTION

There are numerous vacuum cleaner hoses in present use which are comparatively expensive and often employ special fittings which are only usable with a particular hose construction. Further, vacuum cleaner hoses proposed heretofore are often made so that each hose can only receive a particular type of fitting which reduces manufacturing versatility.

SUMMARY

This invention provides a simple and economical hose construction particularly adapted for use on a vacuum cleaner and including a hose having a plurality of integral convolutions which give the hose optimum flexibility wherein at least one convolution comprising an end portion of the hose is used to attach a simple hose fitting thereto in a substantially air-tight manner. Further, the flexible hose comprising the construction of this invention may be cut at various locations along its length so that various types of hose fittings may be readily attached thereto.

Other details, uses, and advantages of this invention will be readily apparent from the exemplary embodiments thereof presented in the following specification, claims, and drawing.

BRIEF DESCRIPTION OF THE DRAWING

The accompanying drawing shows present preferred embodiments of this invention, in which FIG. 1 is a view with parts in cross section and parts broken away illustrating one embodiment of the hose construction of this invention which is comprised of a flexible hose and an end fitting;

FIG. 2 is a view with parts in cross section and parts broken away illustrating the manner of installing the end fitting in the hose of FIG. 1;

FIG. 3 is a greatly enlarged fragmentary view illustrating the configuration of an annular projection extending from the inner end of the fitting comprising the hose construction of FIG. 1;

FIG. 4 is a view with parts in cross section and parts broken away illustrating another exemplary embodiment of the hose construction of this invention;

FIG. 5 is an enlarged fragmentary view with parts in cross section and parts broken away illustrating the manner in which the end fitting comprising the hose construction of FIG. 4 is held in its fastened position by a pair of spaced annular projections which are also utilized to provide a double air seal for the hose construction;

FIG. 6 is a view with parts in cross section and parts broken away illustrating another exemplary embodiment of the hose construction of this invention which has integral convolutions in the form of annular and spiral convolutions and which utilizes a fitting which is threadedly fastened in position and the threadedly fastened fitting may have another fitting attached thereto which is substantially identical to the fitting of FIG. 1; and FIG. 7 is a cross-sectional view of the threadedly fastened fitting of FIG. 6.

DESCRIPTION OF ILLUSTRATED EMBODIMENTS

Reference is now made to FIG. 1 of the drawing which illustrates one exemplary embodiment of an improved hose construction of this invention which is designated generally by the reference numeral 10. The hose construction 10 comprises an elongated flexible tubular member or hose 11 which has an inside diameter 12 and has a plurality of axially spaced annular convolutions 13 provided as an integral part thereof and the plurality of convolutions define a corresponding number of axially spaced annular enlargements 14 in the inside diameter of the hose 11.

The hose 11 also has an integral substantially right circular cylindrical sleeve portion or sleeve 15 comprising one end portion thereof and the sleeve has an inside diameter which is substantially identical to the inside diameter 12 of the hose 11. The sleeve 15 flows smoothly into an adjoining convolution 13 as indicated at 16 and the sleeve 15, convolutions 13, and cylindrical portions of the hose adjoining each immediately adjacent pair of convolutions 13 have substantially equal wall thicknesses.

The hose construction 10 has a fitting which may be in the form of a wand 17 which has an inner end portion provided with means connecting the wand or fitting to the hose 11 in a substantially fluid-tight manner and in this example such connecting means is in the form of a projection 20. As best seen in FIG. 3, the projection 20 is provided at the terminal end of the inner end portion of fitting 17.

The projection 20 has a sloping forward surface 21 which slopes away from the terminal inner end of fitting 17 toward the outer end portion of such fitting. The sloping forward surface 21 of this example has an arcuate configuration, however, it will be appreciated that such surface may be in the form of an inclined substantially planar surface and the sloping surface 21 allows easy insertion of the fitting 17 within the associated end portion of the hose 11. The projection 20 also has a rearwardly hooking surface portion 22 (i.e., hooking toward the unattached or outer end of the fitting) which prevents disassembly of the fitting 17 from its hose 11 and as will be described in more detail subsequently.

The hose 11 and fitting 17 may be readily assembled by relatively moving these two members axially toward each other after aligning associated ends thereof. In particular, the hose 11 may be held stationary and the fixture 17 moved toward such hose, as illustrated by the arrow in FIG. 2. The sloping surface 21 serves as a cam which radially expands or bulges the sleeve 15 locally and allows the projection 20 to pass easily therethrough and into an annular enlargement 14 arranged immediately adjacent the sleeve 15, as illustrated at 23.

The hose 11 and sleeve 15 are made of a plastic material which has elastic properties and as the annular projection 20 is moved along the sleeve 15, the previously mentioned local radial expansion or bulging takes place, as indicated at 24 in FIG. 2. Once the projection 20 moves past a particular axial position of the sleeve 15 the outer portion of the sleeve through which the annular projection 20 has been inserted returns to its original configuration and in a substantially loose fitting manner against the outside surface 25 of the fitting 17.

As previously explained, the annular projection 20 has a rearward hooking surface portion 22 which in the hose construction 10 engages a portion 27 of the convolution 13 (see FIG. 3) defining its associated enlargement 14 and prevents axial withdrawal of the fitting 17 from within the hose 11 during all operating conditions likely to be encountered. However, the fitting 17 is installed in position so that its outside diameter fits loosely within sleeve 15 and the maximum outside diameter of its projection 20 is less than the inside diameter of the convolution within which it is received. Therefore, with the fitting installed in position in the manner illustrated in FIG. 1, it is relatively rotatable with respect to the hose 11 yet the projection 20 and, in particular, its rearwardly hooking surface portion 22 provides a substantially air tight seal between the fitting 17 and the hose 11.

Another exemplary embodiment of the hose construction of this invention is illustrated in FIGS. 4 and 5 of the drawing. The hose construction illustrated in FIGS. 4 and 5 is very similar to the hose construction 10; therefore, such hose construction will be designated generally by the reference numeral 10A and parts of the hose construction 10A which are similar to corresponding parts of the hose construction 10 will be designated by the same reference numeral as in the hose construction 10 also followed by the letter designation A and not described again, inasmuch as the previous description is fully applicable thereto. Only those components parts which are substantially different from corresponding parts of the hose construction 10 will be designated by a new reference numeral also followed by the letter designation A and described in detail.

The hose construction 10A comprises a hose 11A which has an inside diameter 12A and integral annular convolutions 13A defining corresponding enlargements 14A in such diameter. The hose construction 10A also has a fitting 17A attached to an end portion of the hose 11A and the fitting 17A is of unique construction in that it has integral means providing, in essence, a double seal between such fitting and the hose 11A. The hose 11A has an edge 28A which is defined by cutting the hose between a pair of immediately adjacent convolutions 13A and in a plane perpendicular to the longitudinal axis 29A through such hose.

The fitting 17A has an integral right circular cylindrical portion 30A comprising its inner end portion, an outwardly tapering outer portion 31A, and a longitudinally ribbed intermediate portion 32A. The inner portion 30A has a first annular projection 20A which has a sloping forward surface 21A and rearwardly facing surface portion 22A. The fitting 17A also has a second radially extending annular projection 33A provided as an integral part thereof and extending outwardly from inner portion 30A. The projection 33A is spaced from the projection 20A by a distance indicated at 34A.

The fitting 17A is inserted within the hose 11A utilizing cam surface 21A of the annular projection 20A until projection 20A has moved past a plurality of convolutions and in this example fitting 17A is moved until its projection 20A is received within the fifth convolution, see FIG. 4, and the convolutions between projections 20A and 33A are axially compressed. This axial compression is caused because the projections 20A and 33A are spaced apart by the distance 34A whereas with the hose 11A in its normal condition without axial compression the distance between a corresponding number of convolutions is essentially indicated at 36A.

The projection 33A has an inner surface in the form of an annular planar surface 37A which is arranged perpendicular to the longitudinal axis of the fitting 17A and such axis coincides with the axis 29A of hose 11A when the hose is held straight. The axially compressed end convolutions 13A act between projection 20A and projection 33A yieldingly urging planar annular edge 28A tightly against surface 37A in a spring-like manner. Thus, hose construction 10A has the previously mentioned double seal defined by rearwardly facing surface portion 22A engaging a wall portion of its convolution and edge 28A engaging annular surface 37A; however, the hose 11A and fitting 17A though held axially together in a substantially air-tight manner, are easily relatively rotatable.

The inner sleeve-like portion 30A of fitting 17A has an outside diameter which corresponds to and is slightly smaller than the diameter 12A so that the hose 11A may be slid easily thereover. Further, the fitting 17A preferably is made as a single piece construction with projections 20A and 33A extending radially outwardly from the fitting. In addition, the fitting 17A also has a cylindrical portion 41A which adjoins projection 20A and portion 41A is positioned within the hose 11A inwardly of the axially compressed convolutions.

The hose constructions 10 and 10A preferably employ hoses having annular convolutions therein and, in each instance, an enlargement in the inside diameter of the hose defined by a single annular convolution receives a projection of a fitting associated with the particular hose construction to enable installation of the associated fitting in a substantially air-tight manner. Further, as previously mentioned, the fittings 17 and 17A comprising the respective hose constructions 10 and 10A are relatively rotatable with respect to their associated hoses.

Another exemplary embodiment of the hose construction of this invention is illustrated in FIG. 6 of the drawing. The hose construction illustrated in FIG. 6 is very similar to the hose construction 10; therefore, such hose construction will be designated generally by the reference numeral 10B and component parts thereof which are similar to corresponding parts of the hose construction 10 will be designated by the same reference numeral as in the hose construction 10 also followed by the letter designation B and not described again, inasmuch as the previous description is fully applicable thereto. Only those component parts which are substantially different from corresponding parts of the hose construction 10 will be designated by a new reference numeral also followed by the letter designation B and described in detail.

The hose 11B comprising hose construction 10B has an inside diameter 12B and a plurality of integral convolutions in the form of annular convolutions 13B comprising the central portion thereof and spiral convolutions 43B defining opposite end portions with an integral substantially cylindrical portion 44B serving as a transition between each outer end portion and the central portion. The spiral convolutions 43B define an associated thread-like outer portion in hose 11B which is designated generally by the reference numeral 45B.

The hose construction 10B has a fitting designated generally by the reference numeral 17B which has a central portion 46B adjoined at one end by an internally threaded end portion 47B and adjoined at its opposite end by a sleeve-like portion 50B. The internally threaded portion 47B serves as connecting means for connecting the connector 17B to the hose 11B.

Thus, it is a simple matter to provide the fitting 17B at an associated terminal end portion of the hose 11B merely by threading the fitting 17B over the associated thread-like outer portion 45B of the hose 11B. Further, as seen in FIG. 7, the fitting 17B has an annular groove 51B provided therein and the groove 51B is particularly adapted to receive a fitting which may be substantially identical to the fitting 17 of the hose construction 10.

The hose 11B assures optimum manufacturing versatility and ordinarily is used to define the hose construction 10B illustrated in FIG. 6. The hose 11B may also be suitably cut along the dot-dash lines 52B and the adjoining outer threaded end portions 45B discarded whereby a fitting substantially identical to the fitting 17 of the hose 10 may be utilized therewith to define the hose construction 10. The hose 11B may also be suitably cut along the dot-dash lines 53B and the adjoining outer threaded end portions discarded whereupon a fitting substantially identical to fitting 17A may be used therewith to define hose construction 10A.

The fittings 17, 17A, and 17B may be made of any suitable elastomeric material or metallic material. Although fittings 17 and 17A are preferably made of such materials which are comparatively rigid in character, the fitting 17B may be made of either rigid or relatively pliable materials including natural and synthetic rubber compounds or thermosetting as well as thermoplastic materials.

The hoses 11, 11A and 11B may be made of any suitable elastomeric material. However, each hose is preferably made of a thermoplastic material and by continuous differential fluid forming methods such as vacuum forming or blow molding using air under pressure to assure the forming of integral convolutions therein with optimum economy.

While present exemplary embodiments of this invention, and methods of practicing the same, have been illustrated and described, it will be recognized that this invention may be otherwise variously embodied and practiced within the scope of the following claims.

What is claimed is:

1. In combination: a continuous differential pressure formed elongated flexible hose made of an elastomeric material and having a plurality of convolutions provided as an integral part thereof, said hose having an inside diameter and said plurality of convolutions defining a corresponding number of axially spaced annular enlargements in said inside diameter, and a tubular fitting having an inner end portion received within said hose and provided with a first radially extending annular projection within an associated annular enlargement connecting said fitting to said hose, and providing a substantially fluid-tight seal therebetween by engaging at least one of said convolutions while permitting relative rotation of said hose and fitting but preventing relative axial movement therebetween; said fitting also having a second radially extending annular projection spaced from said first-named projection and being positioned within said hose so that the associated end portion of said hose has certain convolutions axially compressed between said projections, the associated end of said hose engaging said second projection and providing another fluid-tight seal between said hose and said fitting.

2. A hose construction comprising, an elongated flexible hose having an inside diameter and having a plurality of axially spaced annular convolutions provided as an integral part thereof, said plurality of convolutions defining a corresponding number of axially spaced annular enlargements in said inside diameter, and a tubular fitting having an inner end portion received within said hose and having a first radially extending annular projection, said projection being received within an associated annular enlargement to allow relative rotation yet prevent axial movement between said hose and said fitting while providing a substantially air-tight seal therebetween; said fitting having a second radially extending annular projection spaced from said first-named projection and being inserted within said tubular member so that the associated end portion of said hose has certain outer convolutions axially compressed between said projections, the outer end of said hose engaging said second projection and providing another substantially air-tight seal between said hose and said fitting.

3. A hose construction as set forth in claim 2 in which said first-named projection has a sloping forward surface portion which slopes from said terminal end toward the outer end of said fitting, said sloping forward surface portion serving as a cam for radially expanding cylindrical portions of said hose interconnecting each pair of adjacent convolutions comprising said axially compressed convolutions and allowing said first-named projection to pass easily therethrough and into an associated annular enlargement.

4. A hose construction as set forth in claim 3 in which said second projection has a planar annular surface which coincides with a plane arranged substantially perpendicular to the longitudinal axis through said hose, said planar annular surface assuring positive sealing of said outer end of said hose thereagainst.

5. A hose construction as set forth in claim 4, in which said hose comprises a single thickness of plastic material.

6. A hose construction as set forth in claim 5 in which said fitting comprises a comparatively rigid non-metallic material.

7. A hose construction as set forth in claim 5 in which said fitting comprises a comparatively rigid metallic material.

8. A hose construction comprising an elongated flexible hose and a tubular fitting received within one end thereof; said hose being made of a resilient plastic material having an integral cylindrical sleeve defining one end portion thereof and a plurality of integrally axially spaced annular convolutions; said fitting being in the form of a wand having a radially extending annular projection mounted within said hose and received within one of said convolutions, said projection allowing relative rotation between said hose and said fitting while providing a substantially air-tight seal therebetween yet preventing axial movement between said hose and fitting, said annular projection having a forward surface portion sloping from one inner end portion toward the outer end of said fitting and having a hooking rearward surface portion which engages a portion of the convolutions to hold said fitting within said hose, said sloping forward surface portion serving as a cam for radially expanding said sleeve and permitting said projection to pass into a convolution adjacent said sleeve.

9. A hose construction as set forth in claim 8 in which said sloping forward surface portion has an arcuate configuration.

* * * * *

PO-1050
(5/69)

UNITED STATES PATENT OFFICE
CERTIFICATE OF CORRECTION

Patent No. __3,727,949__        Dated __April 17, 1973__

Inventor(s) __Donald L. Kleykamp, Peter J. Neroni, Homer N. Holden__

It is certified that error appears in the above-identified patent and that said Letters Patent are hereby corrected as shown below:

Claim 5, line 1, "4" should be --- 2 ---

Claims 6 and 7, line 1, "5" should be --- 2 ---

Signed and sealed this 16th day of April 1974.

(SEAL)
Attest:

EDWARD M. FLETCHER, JR.
Attesting Officer

C. MARSHALL DANN
Commissioner of Patents

PO-1050
(5/69)

UNITED STATES PATENT OFFICE
CERTIFICATE OF CORRECTION

Patent No. 3,727,949           Dated  April 17, 1973

Inventor(s)  Donald L. Kleykamp, Peter J. Neroni and Homer N. Holden

It is certified that error appears in the above-identified patent and that said Letters Patent are hereby corrected as shown below:

Claim 2, line 16, "tubular member" should be --- hose ---

Signed and sealed this 10th day of December 1974.

(SEAL)
Attest:

McCOY M. GIBSON JR.
Attesting Officer

C. MARSHALL DANN
Commissioner of Patents